United States Patent
Knott et al.

(10) Patent No.: US 7,768,267 B2
(45) Date of Patent: Aug. 3, 2010

(54) IONIZATION GAUGE WITH A COLD ELECTRON SOURCE

(75) Inventors: Richard A. Knott, Broomfield, CO (US); Gerardo A. Brucker, Longmont, CO (US); Paul C. Arnold, Boulder, CO (US)

(73) Assignee: Brooks Automation, Inc., Chelmsford, MA (US)

( * ) Notice: Subject to any disclaimer, the term of this patent is extended or adjusted under 35 U.S.C. 154(b) by 278 days.

(21) Appl. No.: 11/827,370

(22) Filed: Jul. 11, 2007

(65) Prior Publication Data

US 2009/0015264 A1 Jan. 15, 2009

(51) Int. Cl.
*G01L 21/30* (2006.01)
*G01L 21/32* (2006.01)
*H05B 31/26* (2006.01)

(52) U.S. Cl. .................. 324/460; 250/397; 315/111.91
(58) Field of Classification Search ................. 324/460, 324/459, 466; 250/489, 423 R, 261, 396 R, 250/505.1, 506.1, 515.1, 397, 398, 222.2; 315/108, 111.81, 111.91
See application file for complete search history.

(56) References Cited

U.S. PATENT DOCUMENTS

| | | | |
|---|---|---|---|
| 2,187,126 A | 1/1940 | Kern et al. | |
| 2,605,431 A | 7/1952 | Bayard | |
| 2,770,735 A | 11/1956 | Clemens et al. | |
| 2,937,295 A | 5/1960 | Redhead | |
| 2,990,493 A | 6/1961 | Seehof et al. | |
| 3,211,937 A | 10/1965 | Hester et al. | |
| 3,312,855 A | 4/1967 | Melling | |
| 3,319,318 A | 5/1967 | Taimuty | |
| 3,353,048 A | 11/1967 | Hagenlocher et al. | |
| 3,495,127 A * | 2/1970 | Lafferty | 315/108 |
| 3,607,680 A | 9/1971 | Uno et al. | |
| 3,624,391 A | 11/1971 | Davison | |
| 4,104,647 A | 8/1978 | Sheldon | |
| 4,321,470 A * | 3/1982 | Kaplan et al. | 250/398 |
| 4,494,036 A | 1/1985 | Neukermans | |
| 4,988,871 A | 1/1991 | Gogol | |

(Continued)

FOREIGN PATENT DOCUMENTS

DE      4219562 C1      7/1993

(Continued)

OTHER PUBLICATIONS

Hot vs. Cold Ionization Gauges, Stanford Research Systems, pp. 1-8, www.thinkSRS.com.

(Continued)

*Primary Examiner*—Hoai-An D Nguyen
(74) *Attorney, Agent, or Firm*—Hamilton, Brook, Smith & Reynolds, P.C.

(57) ABSTRACT

An ionization gauge that eliminates a hot cathode or filament, but maintains a level of precision of gas density measurements approaching that of a hot cathode ionization gauge. The ionization gauge includes a collector electrode disposed in an ionization volume, an electron source without a heated cathode, and an electrostatic shutter that regulates the flow of electrons between the electron source and the ionization volume. The electrostatic shutter controls the flow of electrons based on feedback from an anode defining the ionization volume. The electron source can be a Penning or glow discharge ionization gauge.

28 Claims, 5 Drawing Sheets

U.S. PATENT DOCUMENTS

| | | | |
|---|---|---|---|
| 5,053,343 A * | 10/1991 | Vora et al. ................. 436/153 |
| 5,128,617 A | 7/1992 | Bills |
| 5,278,510 A * | 1/1994 | Baptist et al. ............... 324/460 |
| 5,296,817 A | 3/1994 | Bills et al. |
| 5,378,957 A | 1/1995 | Kelly |
| 5,422,573 A | 6/1995 | Bills et al. |
| 5,561,342 A | 10/1996 | Roeder et al. |
| 5,962,995 A | 10/1999 | Avnery |
| 6,002,202 A | 12/1999 | Meyer et al. |
| 6,023,169 A | 2/2000 | Budovich et al. |
| 6,025,723 A | 2/2000 | Bills |
| 6,046,456 A | 4/2000 | Bills |
| 6,198,105 B1 * | 3/2001 | Bills ........................ 250/397 |
| 6,239,549 B1 | 5/2001 | Laprade |
| 6,509,562 B1 * | 1/2003 | Yang et al. ................. 250/287 |
| 6,566,884 B2 * | 5/2003 | Rutherford et al. .......... 324/460 |
| 6,756,785 B2 | 6/2004 | Peacock et al. |
| 6,822,395 B2 * | 11/2004 | Li et al. ................. 315/111.21 |
| 7,030,619 B2 * | 4/2006 | Arnold et al. ............... 324/460 |
| 7,030,620 B2 | 4/2006 | Correale |
| 7,038,223 B2 | 5/2006 | Starcher |
| 7,049,823 B2 * | 5/2006 | Correale ..................... 324/460 |
| 7,098,667 B2 | 8/2006 | Liu |
| 7,538,320 B2 * | 5/2009 | Sperline .................... 250/286 |
| 2005/0030044 A1 | 2/2005 | Correale |
| 2005/0237066 A1 | 10/2005 | Liu et al. |
| 2006/0261819 A1 | 11/2006 | Liu et al. |

FOREIGN PATENT DOCUMENTS

| | | |
|---|---|---|
| DE | 41 37 527 A1 | 5/2003 |
| EP | 0 646 283 B1 | 4/1995 |
| GB | 889947 | 2/1962 |
| GB | 977431 | 12/1964 |
| GB | 978775 | 12/1964 |
| GB | 2 381 652 A | 7/2003 |
| JP | 03-135746 | 6/1991 |
| JP | 3293533 | 12/1991 |
| JP | 4006431 | 1/1992 |
| WO | WO 93/26032 | 12/1993 |

OTHER PUBLICATIONS

Starcher, R., "Improving Ionization in Mass Spectrometry," *Spectroscopy*, pp. 26-29(Jun. 2003).

Williams, J. D., "Light Ion Bombardment of Targets Comprized of Heavy Atoms: Example- Ar Ions on Tungsten," *CSU Mechanical Engineering*, (Jul. 28, 2006).

Laprade, B.N., "The Development of a Novel, Cold Electron Source," Paper presented at The ASMS conferece, Orlando, FL(Jun. 2002).

"Electrogen™ Electron Generator Arrays" No date given.

"BURLE Electro-Optics Sturbridge, MA Introduces Electrogen™ Electron Generator Arrays" No date given.

Webb, D.R.A., "A Fast Ionization Gauge for Plasma Physics Studies," *Journal of Physics E (Scientific Instruments)*, 7(6): 413-496 (1974).

Author unknown, "Introduction to Bayard-Alpert Style Ionization Gauges," Granville-Phillips, 1999, XP-002375869, retrieved from the Internet: http://www.helixtechnology.com.cn/pdfs/GP/5_bagauges/Intro_to_BA_Gauges.pdf.

Young, J.R., "Penetration of Electrons and Ions in Aluminum," Journal of Applied Physics, vol. 27, No. 1, Jan. 1956, pp. 1-4.

Gentsch, H., et al., "An Improved Ion Gauge with Gold Coated Electrodes for Reliable Operation in Reactive Gases and for use as Reference Standard," *Vacuum*, vol. 35, No. 3, pp. 137-140 (1985).

Hua, Z. Y., et al., "A Group of Terminal-flow UHV Gauges," *J. Vac. Sci. Technol.*, vol. 20, No. 4, pp. 1144-1147 (1982).

Von Chr. Edelmann and P. Englemann, "Possibilities for the Enhancement of the Range of Pressure Measurement with Hot Filament Ionization Gauges," *Vakuum-Technik*, 31, pp. 2-10 (1982).

Saeki, H., et al., "Performance of a Hot-Cathode-Ionization-Gauge Head with Correcting Electrode and Shield Tube, Operated with an Automated-Pressure-Compensating Circuit in a Synchrotron Radiation environment," *J. Vac. Sci. Technol. A*, vol. 24, No. 4, pp. 1148-1150 (Jul./Aug. 2006).

* cited by examiner

IONIZATION GAUGE WITH A COLD ELECTRON SOURCE

BACKGROUND OF THE INVENTION

Hot cathode ionization gauges are the most common nonmagnetic means of measuring very low pressures and the most widely used version worldwide was disclosed in U.S. Pat. No. 2,605,431 in 1952. A typical ionization gauge includes an electron source or a cathode. The electrons emitted by the electron source collide with gas atoms and molecules in an ionization volume and produce ions. The rate at which the ions are formed is directly proportional to the density of the gas (pressure at a constant temperature) in the gauge.

Two types of ionization gauges exist: hot cathode and cold cathode. The most common hot cathode ionization gauge is the Bayard-Alpert (B-A) gauge. The B-A gauge includes a heated filament (cathode) that emits electrons toward a cylindrical wire grid (anode) defining an ionization volume (anode volume). The temperature spread for most commonly used cathodes is about 1,500 degrees Celsius to about 2,200 degrees Celsius. An ion collector electrode is disposed within the ionization volume. Electrons travel from the electron source toward and through the anode, and are eventually collected by the anode. In their travel, the electrons impact molecules and atoms of gas and create ions. The ions are attracted to the ion collector electrode by the electric field within the anode volume. The pressure of the gas within the ionization volume can be calculated from ion current ($I_{ion}$) generated in the ion collector electrode and electron current ($I_{electron}$) generated in the anode by the formula $P=(1/S)(I_{ion}/I_{electron})$, where S is a coefficient with the units of 1/torr and is characteristic of particular gauge geometry, electrical parameters and pressure range.

The operational lifetime of a typical B-A ionization gauge is approximately ten years when the gauge is operated in benign environments. However, these same gauges fail in hours or even minutes when operated at too high a pressure or in gas types that degrade the emission characteristics of the gauge's electron source (hot cathode). Examples of such hot cathode interactions leading to decreased operational lifetime range from degradation of the electron emission properties of the oxide coating on the hot cathode to exposure to water vapor. Degradation of the oxide coating dramatically reduces the number of electrons generated by the cathode, and exposure to water vapor results in the complete burnout of a tungsten cathode.

Cold cathode gauges come in many varieties. They include the Penning, the magnetron, the inverted magnetron, and the double inverted magnetron. The cold cathode inverted magnetron ionization gauge, sometimes referred to as a glow discharge gauge, also includes a cathode and an anode; however, the cathode is barely heated, and may heat to about a twenty degree Celsius rise over ambient temperature. The initial source of electrons is by a spontaneous emission event, or by a cosmic ray. As the electrons circle about the anode, the electrons ionize gas molecules and atoms through electron impact ionization, and other electrons are released by this event. As the cathode captures the ions, a current is generated in the cathode. This current is used as an indication of gas density and pressure. The capture of ions at the cathode also releases more electrons which are contained by the crossed electric and magnetic fields and sustains the discharge. In this way, a "cloud" of electrons and ions known as a plasma is formed in the ionization volume. However, cold cathode gauges suffer from relatively large inaccuracies due to uncontrolled discharge of electrons and surface phenomena.

SUMMARY OF THE INVENTION

An ionization gauge or corresponding method in accordance with an embodiment of the present invention eliminates the hot cathode or filament, but maintains the same level of precision of gas density measurements provided by a hot cathode ionization gauge. The ionization gauge includes a cold electron source, a collector electrode disposed in an ionization volume, and a regulated electrostatic shutter. The electrostatic shutter controls the flow of electrons between the electron source and an ionization volume based on the number of electrons in the ionization volume. The collector electrode then collects ions formed by the impact between the electrons and gas molecules in the ionization volume. In another embodiment of the present disclosure, the ionization gauge may also include multiple, or at least two collector electrodes. The collector electrodes may be positioned in the same location or in different locations relative to one another.

The ionization gauge can include an anode which defines the ionization volume and retains the electrons in a region of the anode. The collector electrode can be disposed within the ionization volume. The ionization gauge can include elements of a Bayard-Alpert type vacuum gauge. The electron source can be an inverted magnetron cold cathode gauge or glow discharge ionization gauge.

In yet another embodiment of the present disclosure, there is provided an ionization gauge. The ionization gauge has a source that generates electrons and a collector electrode. The collector electrode is disposed in an ionization volume and collects ions. The ionization gauge also has an electrostatic shutter that is configured to control the flow of electrons between the electron source, and the ionization volume. The ionization gauge also has an envelope that surrounds the source. The electrostatic shutter and the envelope permit electrons from a predetermined electric potential region to enter into the ionization volume.

In another embodiment, the anode of the electron source is connected to ground, and the envelope is connected to a negatively charged voltage potential. This permits electrons that are located near the anode to enter the ionization volume.

The ionization gauge may also be configured to have an annular ring of an electrostatic shutter (or shutters), which is located near the periphery of the envelope, or end. The electron source can be a cold cathode ionization source, which has an anode connected to a voltage source. The envelope can be grounded. This allows electrons that are located near the envelope to enter the ionization volume.

In yet another embodiment, there is provided a method of measuring gas pressure. The method generates electrons, and regulates the flow of electrons from a source to the ionization volume. The method also controls the energy of the electrons from the source, and then collects ions. The electron energy can be controlled by operating the anode at a ground potential and operating an envelope that surrounds the electron source at a predetermined negative potential. The electron energy can be controlled by operating the anode at a predetermined voltage, and operating an envelope that surrounds the anode at a ground potential.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
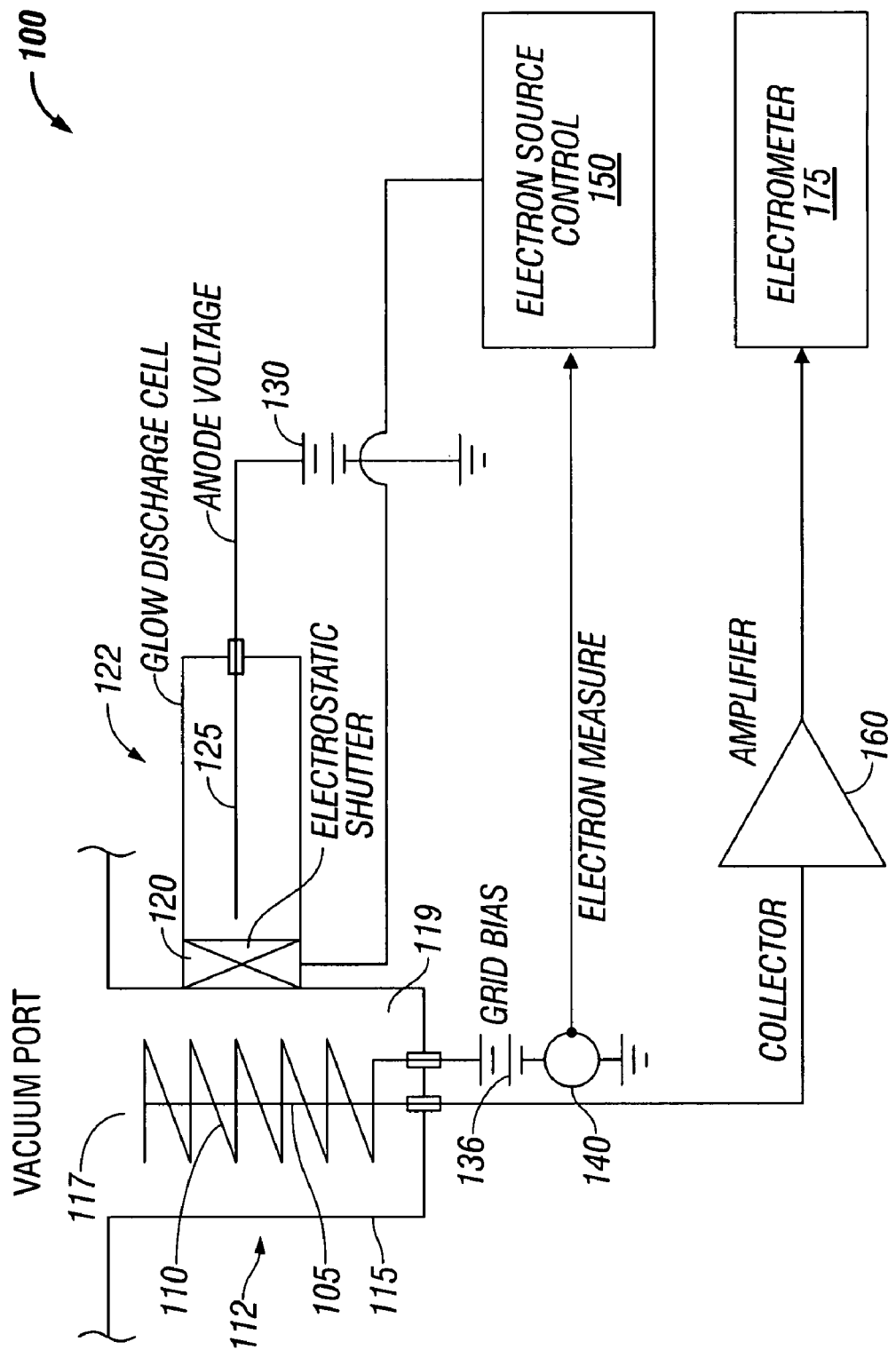
FIG. 1 is a schematic view of an ionization gauge according to an embodiment of the present invention.

As shown in FIG. 1, an ionization gauge 100 according to an embodiment includes a typical B-A ionization gauge 112 without a hot cathode but with a cold electron source 122. The B-A ionization gauge 112 may be a nude or non-nude type ionization gauge. The cold electron source 122 may be a cold cathode ionization gauge such as a glow discharge cell, of which one version is the inverted magnetron. The glow discharge cell generates an electron cloud using crossed electrostatic and magnetic fields. Other cold cathode ionization gauges that may be used as the cold electron source 122 include the Penning gauge, magnetron and the double inverted magnetron.

Generally, the inverted magnetron type gauge has two electrodes with an electric field between them caused by an anode being positive with respect to a cathode. Likewise, the cathode is negative with respect to the anode. The inverted magnetron type gauge is surrounded by a magnet (not shown) which has lines of force going lengthwise through the volume perpendicular to the electric field. Generally, the anode attracts electrons which cannot go directly to the anode due to the crossed magnetic fields. The cathode attracts positively ionized atoms and molecules. The cathode generates electrons when ions impact it, and the cathode is generally sufficiently large so the ions do not miss the cathode during travel. The cold electron source 122 may also be a field emission electron source that includes a cathode or an array of cathodes with a gradient or a sharp point at the emitting end of the cathodes.

The cold electron source 122 includes an anode 125 that receives power from an anode voltage source 130. The cold electron source 122 opens into a measurement chamber 119 of the B-A ionization gauge 112 through an electrostatic shutter 120. The B-A ionization gauge 112 includes a collector electrode 105 and an anode or grid 110. The grid 110 defines an anode or ionization volume. The grid 110 can take the form of a helical coil grid or a cylindrical mesh grid or any other shape that allows electrons to enter an ionization volume. A grid bias power supply 136 provides a constant positive voltage with reference to ground to the grid 110. An ammeter 140 connects to the grid 110 and provides an output signal to an electron source control 150. The electron source control 150, in turn, provides an output signal to the electrostatic shutter 120. Finally, the collector electrode 105 connects through an amplifier 160 to an electrometer 175.

In operation, molecules and atoms of gas enter the measurement chamber 119 through a vacuum port 117. The cold electron source 122 generates an electron cloud or plasma of copious amounts of energetic electrons. The electrostatic shutter 120 allows a regulated or controlled quantity of these electrons to exit from the cold electron source 122 into the B-A ionization gauge's measurement chamber 119 by, for example, providing a well-regulated, modulated high voltage power supply pulse at the exit to the cold electron source 122. Alternatively, instead of a pulse as mentioned above, other configurations may also be possible to allow a controlled or regulated quantity of electrons to exit from the cold electron source 122 to the chamber 119.

In another embodiment, a control voltage may vary continuously and the pulse may vary in height, width or shape in order to allow a controlled or regulated quantity of electrons to exit from the cold electron source 122 to the chamber 119. Various configurations are possible and within the scope of the present disclosure. Most electrons do not strike the grid 110 immediately but pass through the grid 110 and into the ionization volume defined by the grid 110 where they create positive ions through electron impact ionization.

The ions, once created by electron impact ionization, tend to stay within the grid 110. The ions formed within the grid 110 are directed to the collector electrode 105 by the electric field produced by a difference in potential between (a) the anode grid 110 at a potential that is positive with respect to ground and (b) the collector electrode 105 which is at a potential which is near ground potential (i.e., negative relative to the anode grid potential). The ions are collected by the collector electrode 105 to provide an ion current in the collector electrode 105. The collector current is then amplified by the amplifier 160 and provided to an electrometer 175. The electrometer 175 provides an indication of the magnitude of the collector current that is calibrated in units of pressure.

The ammeter 140 measures an electron current generated in the grid 110 from electrons that arrive at the grid 110. This measured current represents the number of electrons being provided to the ionization volume from the cold electron source 122. The measured current information from the ammeter 140 is provided to an electron source control unit 150 which uses the current information as feedback to control the electrostatic shutter 120.

The electrostatic shutter 120 may act as a controlling grid (that is insulated from a mounting) at the port of the attachment of the cold electron source 122 to the ionization envelope 115. A value of the grid 110 current measured by the ammeter 140 dictates the voltage on the controlling grid, which then controls the quantity of electrons flowing from the cold electron source 122 to the ionization gauge 100 when the controlling pulse occurs. It is envisioned that, in one embodiment, the ammeter 140 provides a signal and then, subsequently, the controlling voltage pulse occurs. The electron source control unit 150 regulates the quantity of electrons supplied to the ionization volume from the cold electron source 122 to ensure optimum ionization.

Figure 2:
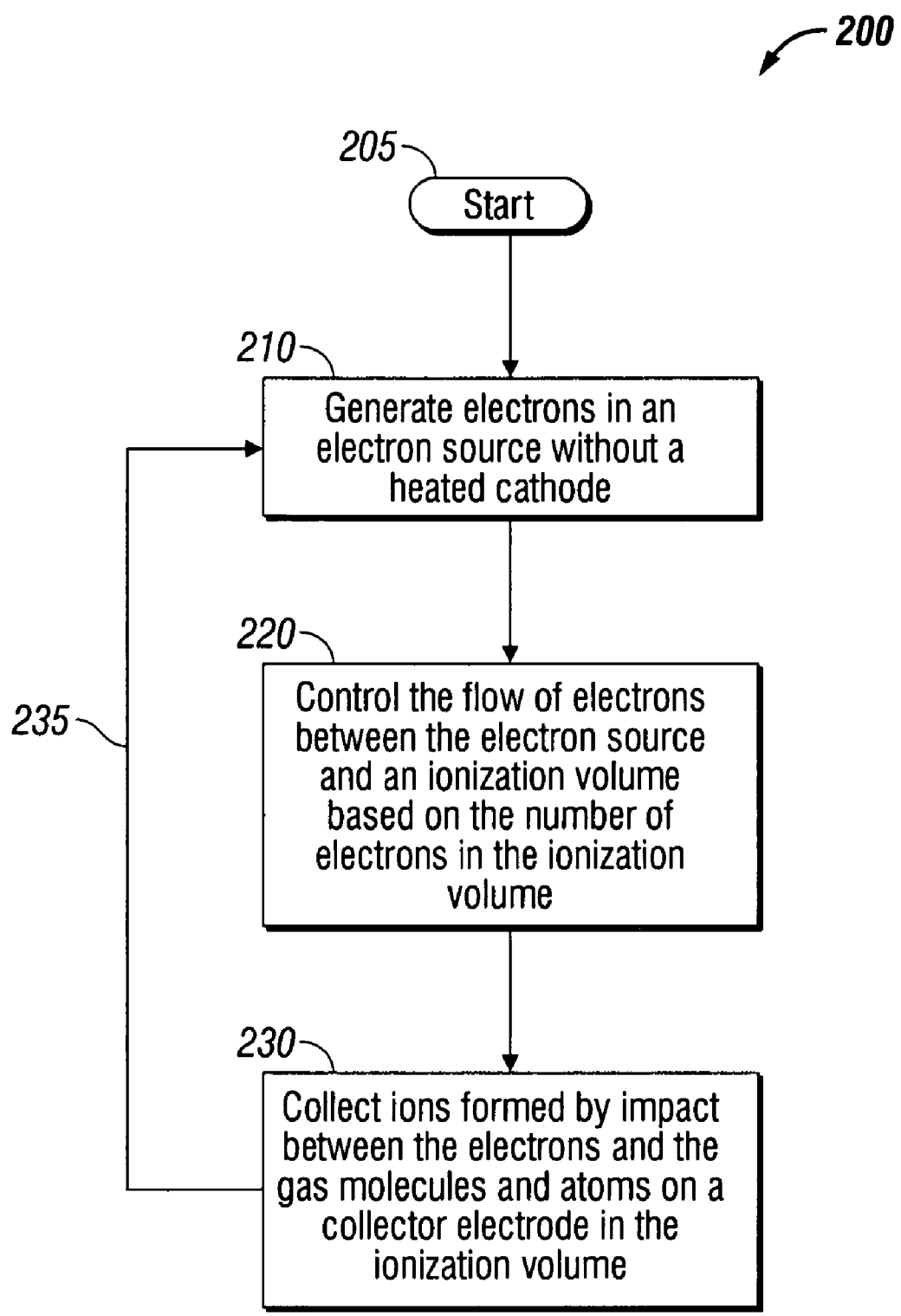
FIG. 2 is a flow diagram according to an embodiment of the present invention.

FIG. 2 is a flow diagram of a process of measuring a gas pressure 200 according to an embodiment of the present invention. After the process starts (205), an electron source generates electrons (210). Then, the flow of electrons between the electron source and an ionization volume is regulated (220) based on the number of electrons in the ionization volume. Finally, ions formed by impact between the electrons and the gas molecules and atoms in the ionization volume are collected (230). The process 200 then repeats (235).

Figure 4:
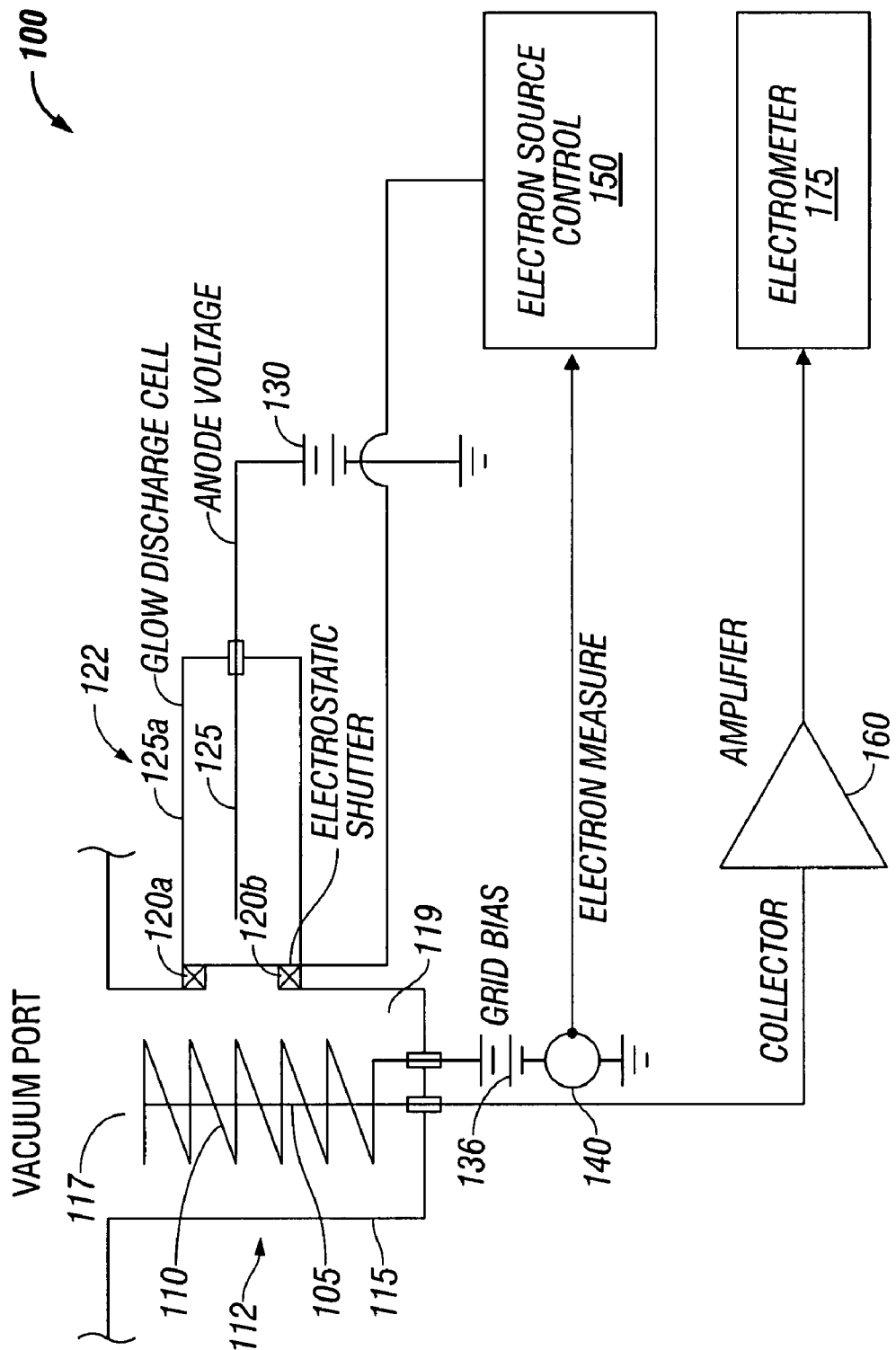
FIGS. 4 and 5 show a schematic view of other embodiments of the ionization gauge for controlling electrons to allow electrons from a low potential region to enter the ionization volume.
Figure 5:
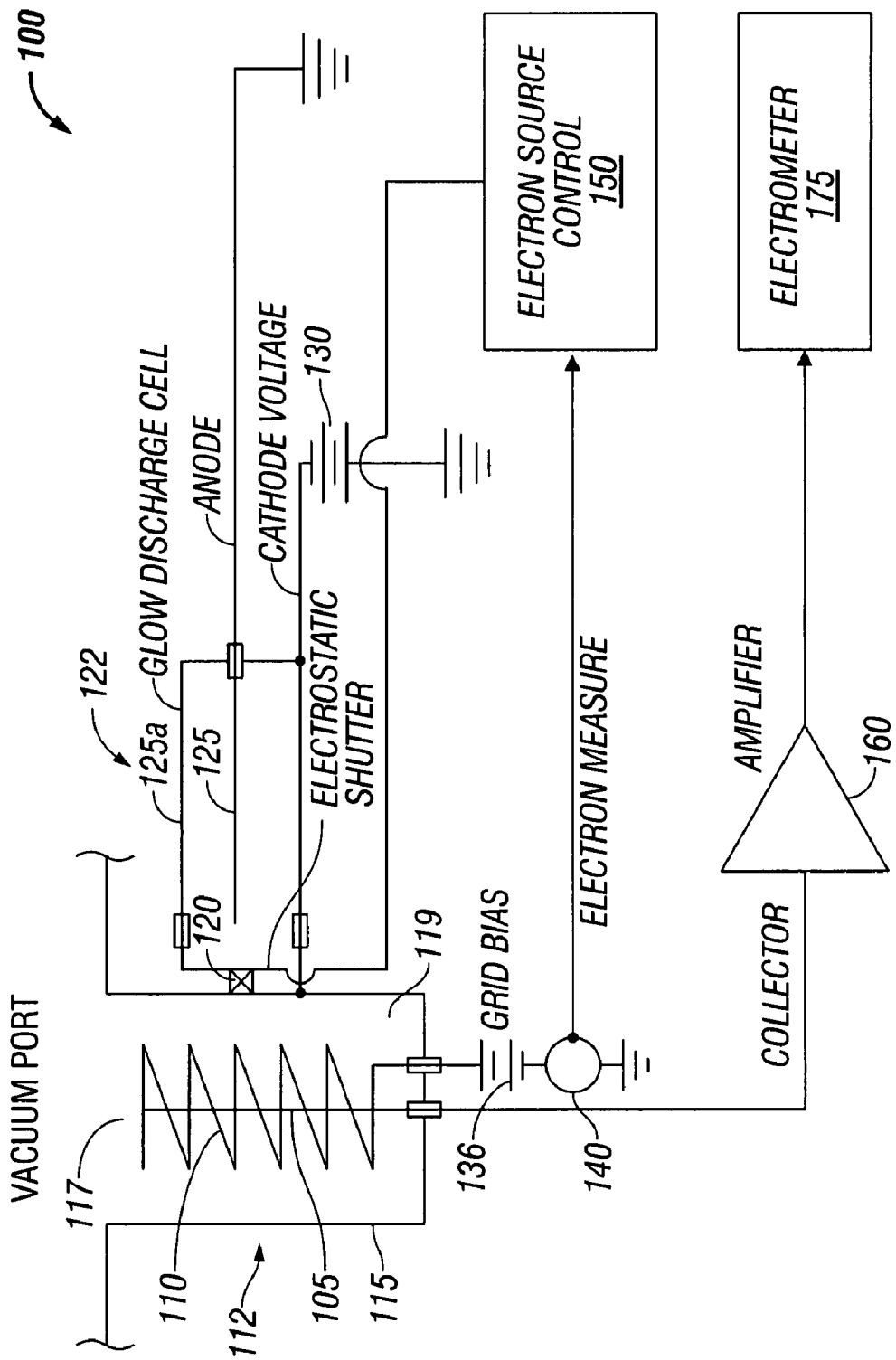

In another embodiment of the present disclosure, the method 200 may further include filtering the flow of electrons to limit the flow to a predetermined energy range. Other embodiments of the electrostatic shutter are shown in FIGS. 4 and 5. The filtering can be electrostatic filtering, and a geometry of the gauge can be changed or modulated in order to further assist with filtering. The method 200 may also further include modulating a voltage of the electron source in response to pressure. In yet another embodiment, the method 200 may further include that a gauge geometry may also be modified to produce an electron current in response to a pressure.

Figure 3:
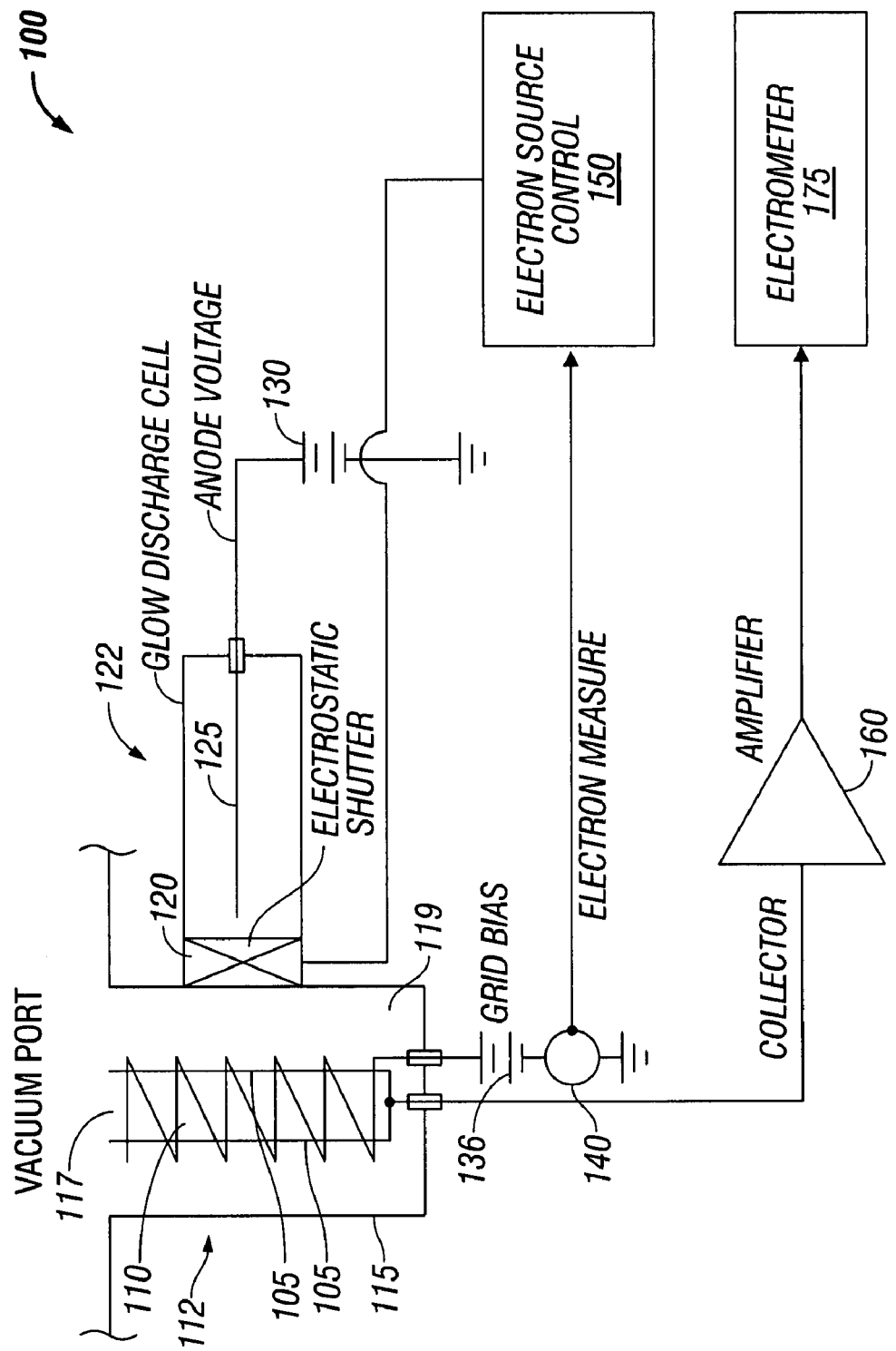
FIG. 3 is a schematic view of an ionization gauge according to a different embodiment of the present invention having a second collector electrode.

Turning now to FIG. 3, in a further embodiment of the present disclosure. Here, the Bayard-Alpert ionization gauge 100 includes a second ion collector electrode 105' in addition to the ion collector electrode 105. Here, the second ion collector electrode 105' is positioned inside the anode grid 110 to assist in better ion collection. The ions, once created by electron impact ionization, tend to stay within the anode grid 110, while at higher pressures the ions also tend to stay outside the grid 100. The collector current is then amplified by the amplifier 160 and provided to an electrometer 175. The electrometer 175 provides an indication of the strength of the collector current that is calibrated in units of pressure.

Turning now to FIG. 4, there is shown an alternative embodiment of an ionization gauge 100 that has a cold electron source 122. The electrostatic shutter 120 of FIG. 1 is replaced with an annular electrostatic shutter generally shown as 120a and 120b which is located at the periphery of the opening of the envelope 125a or end of cold electron source 122. One electrostatic shutter 120 is also envisioned with portions 120a and 120b, and the present disclosure is not limited to any specific number of shutters. The ionization gauge 112 also includes a cold electron source 122 that releases electrons into the ionization envelope 115. Again, the shutter 120a, 120b acts as a controlling grid to envelope 115; however, in this embodiment, electrons escape from the cold electron source 122 from a relatively low electrical potential region. This allows electron control in the envelope 115. FIG. 4 shows a configuration where electrons, from a low potential region, escape from the cold electron source 122 to the ionization volume 119. Preferably, the cold cathode/glow discharge gauge has the anode 125 at a high voltage which is connected to anode voltage source 130. Preferably, the anode 125 is housed in a cold cathode envelope 125a which is connected to the ground. Cold cathode envelope 125a preferably is a cylindrical shaped member with a circular cross section; however, the cold cathode envelope 125a is not limited to this shape, and may have a different shape. Thus, electrons near the cathode envelope 125a escape and are released into the ionization envelope 115. This allows only electrons, which are located near the cold cathode envelope 125a to escape. This allows the energy spread of electrons to be controlled, and the ionization gauge 100 releases electrons at a relatively low potential into the ionization envelope 115.

Turning to FIG. 5, there is shown yet another embodiment of the present ionization gauge 100. In this embodiment, electrons near the anode 125 escape and enter the ionization volume 119. In this embodiment, the center anode 125 of the cold electron source 122 is connected to ground, while the cold cathode envelope 125a is operated at a negative, high voltage value, and is connected to anode voltage source 130. This permits electrons to escape from the cold electron source 122 at a low energy to control the energy spread of electrons by the value of the anode voltage source 130, and by using an electrostatic shutter 120.

While this invention has been particularly shown and described with references to preferred embodiments thereof, it will be understood by those skilled in the art that various changes in form and details may be made therein without departing from the scope of the invention encompassed by the appended claims.

What is claimed is:

1. An ionization gauge comprising:
   a cold cathode electron source comprising an electron source volume in which electrons are generated;
   an ionization volume distinct from the electron source volume;
   a collector electrode disposed in the ionization volume, the collector electrode configured to collect ions formed by the impact between the electrons and gas molecules and atoms to provide a gas pressure output; and
   an electrostatic shutter between the electron source volume and the ionization volume configured to control the flow of electrons from the electron source volume to the ionization volume.

2. The ionization gauge according to claim 1 wherein the electrostatic shutter is pulsed to control the flow of electrons between the electron source and the ionization volume.

3. The ionization gauge according to claim 1 wherein the electrostatic shutter is configured to control the flow of electrons based on the number of electrons in the ionization volume.

4. The ionization gauge according to claim 1 further comprising an anode defining the ionization volume.

5. The ionization gauge according to claim 4 wherein the electrostatic shutter is configured to control the flow of electrons based on the electron current generated in the anode.

6. The ionization gauge according to claim 5 wherein the electron current generated in the anode is measured by an ammeter.

7. The ionization gauge according to claim 1, wherein the electrostatic shutter is configured as a grid adapted to control the flow of electrons between the electron source volume and the ionization volume.

8. An ionization gauge comprising:
   a cold cathode electron source comprising an electron source volume in which electrons are generated;
   an ionization volume distinct from the electron source volume;
   a first collector electrode, and a second collector electrode with both being disposed in the ionization volume, the first and second collector electrodes configured to collect ions formed by the impact between the electrons and gas molecules and atoms to provide a gas pressure output; and
   an electrostatic shutter between the electron source volume and the ionization volume configured to control the flow of electrons from the electron source volume to the ionization volume.

9. The ionization gauge according to claim 8, wherein the electrostatic shutter is configured as a grid adapted to control the flow of electrons between the electron source volume and the ionization volume.

10. The ionization gauge according to claim 8 wherein the electrostatic shutter is configured to control the flow of electrons based on the number of electrons in the ionization volume.

11. The ionization gauge according to claim 8 further comprising an anode defining the ionization volume.

12. The ionization gauge according to claim 11 wherein the electrostatic shutter is configured to control the flow of electrons based on the electron current generated in the anode.

13. The ionization gauge according to claim 11 wherein the electron current generated in the anode is measured by an ammeter.

14. The ionization gauge according to claim 8 wherein the electrostatic shutter is pulsed to control the flow of electrons between the electron source and the ionization volume.

15. A method of measuring a gas pressure from gas molecules and atoms, comprising:
generating electrons in a cold cathode electron source comprising an electron source volume;
regulating the flow of electrons by an electrostatic shutter between the electron source volume and an ionization volume distinct from the electron source volume; and
collecting ions formed by an impact between the electrons and the gas molecules and atoms in the ionization volume to provide a gas pressure output.

16. The method according to claim 15, further comprising regulating the flow of electrons between the electron source and the ionization volume by filtering the flow to limit the flow to a predetermined energy range between the source and the ionization volume.

17. The method according to claim 16, further comprising filtering the flow by modulating a geometry of the ionization gauge.

18. The method according to claim 15, further comprising regulating the flow of electrons between the electron source and the ionization volume by modulating a voltage of the electron source in response to pressure.

19. The method according to claim 15, further comprising regulating the flow of electrons between the electron source and the ionization volume by modulating an ionization gauge geometry to produce an electron current in response to a pressure.

20. The method according to claim 16, further comprising filtering the flow by electrostatic filtering.

21. An ionization gauge comprising:
a cold cathode electron source comprising an electron source volume in which electrons are generated;
an ionization volume distinct from the electron source volume;
a collector electrode disposed in the ionization volume, the collector electrode configured to collect ions formed by the impact between the electrons and gas molecules and atoms to provide a gas pressure output;
an electrostatic shutter between the electron source volume and the ionization volume configured to control the flow of electrons from the electron source volume to the ionization volume; and
an envelope surrounding the electron source volume and the electrostatic shutter, the envelope permitting electrons from a predetermined electric potential to enter into the ionization volume.

22. The ionization gauge of claim 21, wherein the cold cathode source includes an anode connected to an anode voltage source, and wherein the envelope is grounded allowing electrons located near the envelope to enter the ionization volume.

23. The ionization gauge of claim 22, further comprising an annular ring of electrostatic shutters being located at substantially a periphery of the envelope.

24. The ionization gauge of claim 21, wherein the electron source has an anode connected to ground, and wherein the envelope is connected to a negatively charged voltage potential to permit electrons located near the anode of the electron source to enter the ionization volume.

25. The ionization gauge according to claim 21, wherein the electrostatic shutter is configured as a grid adapted to control the flow of electrons between the electron source volume and the ionization volume.

26. A method of measuring a gas pressure from gas molecules and atoms comprising:
generating electrons in a cold cathode electron source comprising an electron source volume;
regulating the flow of electrons by an electrostatic shutter between the electron source volume and an ionization volume distinct from the electron source volume;
controlling the electron energy from the electron source; and
collecting ions formed by an impact between the electrons and gas molecules and atoms in the ionization volume to provide a gas pressure output.

27. The method of claim 26, further comprising controlling the electron energy from the electron source by operating an anode of the electron source at a ground potential, and operating an envelope that surrounds the anode of the electron source at a predetermined negative voltage potential.

28. The method of claim 26, further comprising controlling the electron energy from the electron source by operating an anode of the electron source at a predetermined voltage potential, and operating an envelope that surrounds the anode at a ground potential.

* * * * *